Jan. 9, 1968　　　　　M. J. DUNN　　　　　3,362,230
TORQUE REDUCING APPARATUS
Filed Oct. 18, 1965
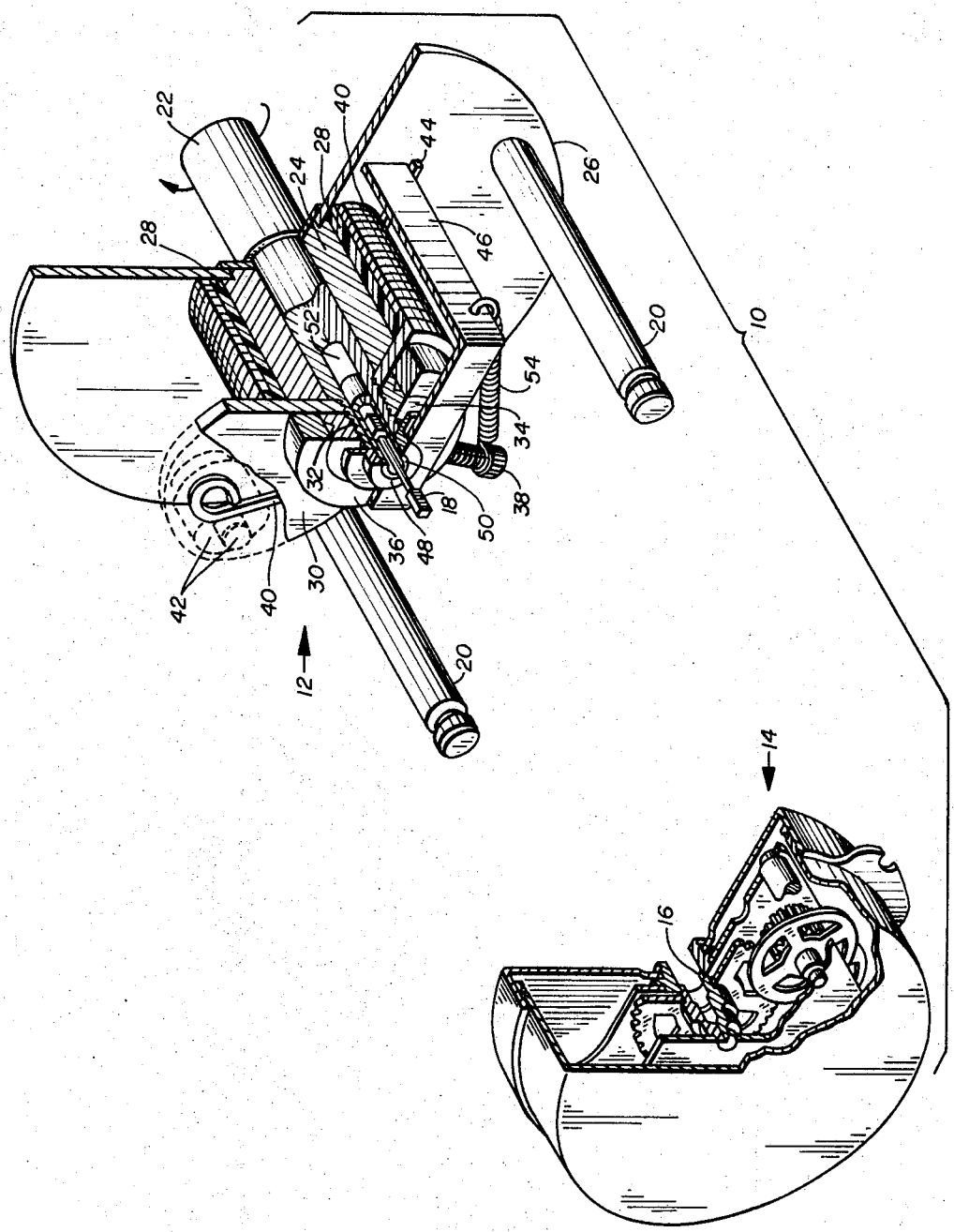
INVENTOR.
M. JAMES DUNN
BY *Head & Johnson*
ATTORNEYS 3,362,230
TORQUE REDUCING APPARATUS
Michael J. Dunn, Tulsa, Okla., assignor to Precision Products & Controls, Inc., Tulsa, Okla., a corporation of Oklahoma
Filed Oct. 18, 1965, Ser. No. 496,859
6 Claims. (Cl. 74—1.5)

ABSTRACT OF THE DISCLOSURE

An escapement controlled high torque drive shaft is braked utilizing a sleeve made of a material of substantially nearly equal static and dynamic coefficients of friction about which a clutch spring is wound.

---

This invention relates to and has for its general object to provide a torque reducing apparatus to control the constant rate of rotation of an escapement controlled drive shaft which is under a relatively high restraining torque.

Many industrial operations, parking meters, chart drives and other controls require the timed rotation of a cam or a shaft for the sequential actuation of machine elements. Generally, escapement type timing mechanisms are used for accurately controlling the transmission of power to a shaft for driving the shaft at a constant angular speed. However, it is known that any increase in torque to the input of an escapement mechanism tends to speed it up while conversely a decrease slows it down. In many instances the power is derived from a spring motor, D.C. electrical power, air or other motive power sources.

Accordingly, it is an object of this invention to provide a torque reducing apparatus which overcomes the problems heretofore encountered when utilizing small mechanical escapement timing mechanisms.

It is another object of this invention to provide a torque reducing or controlling device which operates to control a drive shaft which is under a high restraining torque by an escapement mechanism which has a relatively low torque capacity. The range of torque within the realm of this invention includes high torque up to 100 lb.-in., whereas the escapement torque is in the range of 0.2 to 0.4 lb.-in.

These and other objects of this invention will become more apparent upon further reading of the specification and claims when taken in conjunction with the illustration which is an exploded perspective view, partly in section, describing the torque reducer and escapement assembly of this invention.

The torque reduction device of this invention is generally indicated by the numeral 12 which is incorporated with the escapement mechanism generally indicated by the numeral 14, such as the type described in U.S. Patent 2,694,287, issued Nov. 16, 1954. The specific details of the escapement assembly are not important to this invention and accordingly are not described in great detail herein. Ordinarily the assembly includes an input bushing 16 which is adapted to lock and receive a drive pin 18 from the torque reducing device as hereafter described. Ordinarily the escapement or governor mechanism is supported to the device 12 by spaced pins 20, two of which are shown with three ordinarily utilized. The torque reducing device 12 comprises a input shaft 22 which is rotatable within bushing 24. Shaft 22 is coupled to the device, the speed of which must be controlled. The bushing 24 is fixed to mounting plate 26. The bushing may be entirely formed or include, as shown, a pressed on or molded sleeve 28. The sleeve 28 or entire bushing as the case may be is formed of a material in which the static and dynamic co-efficients of friction are substantially near equal. Typically, such materials include certain flurocarbons such ts "Teflon," but preferably effective for this invention are synthetic resins of the acetal plastic group, more particularly, a synthetic resin such as is sold by Du Pont under the trademark "Delrin." An input shaft arm 30 is affixed to input shaft 22 by threads 32 and locked thereon by ring collar 34. An adjusting ring 36 extends about the periphery of collar 34 and is anchored thereto by screw 38 in the desired position. One end of brake spring 40 is anchored to the input shaft arm 30 by means of a screw and nut, shown in phantom and designated by the numeral 42. The spring 40 is preferably of a rectangular cross-section so as to provide a maximum surface area contact about sleeve 28 over which it is wound. The other end of brake spring 40, which is adjacent to mounting plate 26, extends outward away from the coils to form a short tang 44 which abuts release arm 46. The release arm is bent angularly as shown with the other end affixed to release arm shaft sleeve 48 which includes shaft 50 which extends within an opening 52 of input shaft 22. The bushing is rotatable therein relative to the shaft rotation. The connecting drive pin 18 is affixed therein so as to be rotatable with the shaft 50. Bias spring 54 supplies the release force, through release arm 46, to brake spring 40 and is connected between the adjustment ring screw 38 and release arm 46 as shown, tending, as such, to rotate the release arm in the same direction that the input shaft arm is rotating.

In operation, a high torque, which may be supplied from a spring motor or other well known power supply, is applied to drive shaft 22, the angular speed of which is controlled in accordance with the timing escapement or governor movement. The torque force from the input shaft 22 is transferred to the brake spring 40 by way of arm 30 when rotated in the direction shown by the arrow. This causes the spring to wind tightly about the "Delrin" sleeve 28, with a resulting increase in resisting friction. At this point the input shaft and brake spring are locked since the coiling friction torque of the brake spring balances the input torque. If, however, a very small force is applied to the release arm 46 against the tang 44 of the brake spring 40, the coil will unwind slightly releasing the input shaft at the same rate as the release arm is being turned. The force to rotate release arm 46 is supplied by spring 54 which is anchored to the adjusting ring 36 by screw 38. Since the adjusting ring turns with shaft 22, the anchor screw through spring 54 takes up the release motion of arm 46. The adjusting ring is set initially to stretch spring 54 to the proper spring force operating point. The rate of release of arm 46 is controlled, however, by the escapement governor mechanism 14 which is coupled to drive pin 18 within input bushing 16.

It will become apparent that the torque control mechanism of this invention may be advantageously utilized in a variety of industrial operations without departing from the spirit and character of this invention. The specific embodiment described herein is illustrative only as the scope of the invention is to be measured by the appended claims within their allowed range of equivalency.

What is claimed:
1. The combination of
  a shaft adapted to be driven under high torque from a power source;
  a mounting plate supporting an escapement to control the rotation of said shaft; and
  a torque reducer between said shaft and said escapement comprising:
    a bushing fixed to said mounting plate with said shaft rotatable therein, said bushing of a material having substantially equal static and dynamic co-efficients of friction,
    an input shaft arm affixed to said shaft,
    a brake spring wound around said bushing, one end of which is attached to said input shaft arm, the other end being free, a release arm rotatably supported with respect to said shaft and interconnecting said escapement and its movement mechanism with the free end of said brake spring, and a spring between said input shaft arm and said release arm tending to draw said release arm to said input shaft arm and unwind said brake spring in timed relationship.

2. The combination defined in claim 1 wherein said bushing is an acetal plastic.

3. The combination defined in claim 1 wherein said brake spring is of rectangular cross-section.

4. The combination of a shaft adapted to be driven under high torque from a power source;

a mounting plate supporting an escapement to control the rotation of said shaft; and a torque reducer between said shaft and said escapement comprising:

a bushing fixed to said mounting plate with said shaft rotatable therein, said bushing of a material having substantially equal static and dynamic coefficients of friction, an input shaft arm affixed to said shaft, a brake spring wound around said bushing, one end of which is attached to said input shaft arm, the other end being free, a release arm rotatably supported with respect to said shaft and interconnecting said escapement and its movement mechanism with the free end of said brake spring, an adjustment ring co-axially movable with respect to said input shaft arm and attachable thereto at a desired position, and a spring, one end attached to said release arm and the other end to said adjustment ring, tending to draw said release arm to said input shaft arm and unwind said brake spring in timed relationship dictated by said escapement mechanism.

5. The combination of a shaft adapted to be rotated under high torque from a power source, an escapement mechanism of relatively low input torque connected to control the timed rotation of said shaft, and brake means to reduce the torque between said shaft and said escapement mechanism.

6. The combination of a mounting plate, a bushing fixed at one end to said mounting plate, said bushing of a material having substantially equal static and dynamic coefficients of friction, a drive shaft rotatably supported by said bushing, said shaft being driven under high torque from a power source, an input shaft arm attached to said drive shaft adjacent the other end of said bushing and rotatable with said drive shaft, a brake spring of rectangular cross-section spirally wound about said bushing, one end of which is attached to said input shaft arm, the other end of which extends outward from said bushing to form a tang, an adjustment ring co-axially movable with respect to said drive shaft and including means to lock said ring thereto at a desired position, an escapement attached to said mounting plate adjacent said other end of said bushing, a release shaft rotatably supported within said drive shaft and connectable with said escapement mechanism, a release arm attached to and rotatable with said release shaft and abuttable against said tang whereby movement dictated by said escapement mechanism will tend to cause said brake spring to uncoil, and a release spring attached between said adjustment ring and said release arm.

References Cited
UNITED STATES PATENTS 2,662,595  12/1953  Neumann _____ 74—3.54

MILTON KAUFMAN, *Primary Examiner.*